Aug. 4, 1931.  F. T. POTTER  1,816,867
REDUCTION GEAR CHANGE SPEED UNIT
Filed July 19, 1929
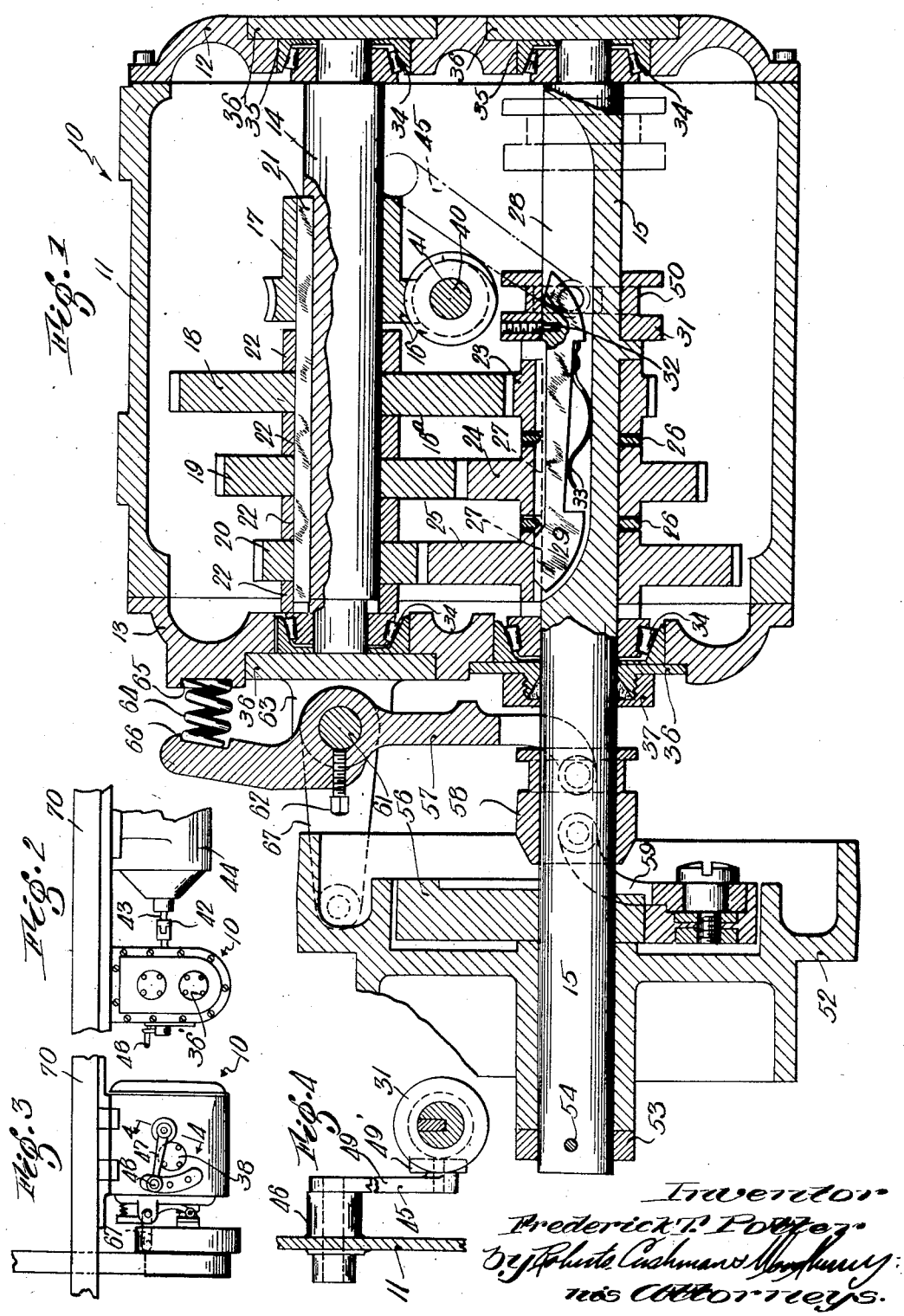

Patented Aug. 4, 1931

1,816,867

UNITED STATES PATENT OFFICE

FREDERICK T. POTTER, OF NEWTON, MASSACHUSETTS, ASSIGNOR TO STARK TOOL COMPANY, OF WALTHAM, MASSACHUSETTS, A CORPORATION OF MASSACHUSETTS

REDUCTION-GEAR CHANGE-SPEED UNIT

Application filed July 19, 1929. Serial No. 379,410.

This invention relates to reduction gearing, and particularly to change-speed reduction gearing of the type adapted for use with individual motor drive units for transmitting power from a motor to a machine for driving the latter. An object of this invention is to improve the construction of apparatus of the class described.

A gear set for an individual motor drive unit should include reduction gearing for transmitting power delivered by the motor at a reduced speed for driving a machine, and provision should also be made for delivering power to the driven machine at different operating speeds to facilitate the carrying out of different operations. The driving motors and the gear sets are usually made by different manufacturers, and it is advantageous to have a gear set which may be readily connected with a standard motor and which is not only compact and accessible in itself, but which is adapted for connection between the motor and the machine in such a manner as to permit the entire motor drive unit to occupy minimum space and, preferably, to occupy space which is not otherwise useful and which also affords a convenient and accessible location for the unit.

Some of the more specific objects of this invention are to provide change-speed reduction gearing of rugged and compact construction and which shall also be simple and efficient in operation; to arrange change-speed reduction gearing in a unit for connection with a driving motor in such a manner that the entire motor drive unit shall be compact and adapted to utilize space to the best advantage for efficient operation; to provide a change-speed reduction gear set in which the various parts shall be readily accessible for replacement or repair as well as for accurate adjustment without disconnecting the gear set, or removing or otherwise disturbing other elements either of the motor drive unit or of the driven machine; to provide relatively simple means consisting of few parts for assuring positive operation of the change-speed gearing and for preventing damage to the apparatus during the operation of the change-speed mechanism.

These and other objects are effected by my invention as will be apparent from the following description and claims taken in connection with the accompanying drawings forming a part of this application, and in which:

Fig. 1 is a sectional elevation of a gear set;

Fig. 2 is an end elevation of the gear set showing the relative arrangement of the gear set and the driving motor;

Fig. 3 is a side elevation of the gear set; and

Fig. 4 is a section on the line 4—4 of Fig. 3, showing the lever for operating the change-speed mechanism.

In accordance with a preferred embodiment of the present invention, reduction gearing is provided for receiving power from a drive shaft and for transmitting power at a reduced speed to a countershaft which is disposed preferably at substantially right angles to the drive shaft. Change-speed gearing is arranged for transmitting power from the countershaft to a driven shaft disposed substantially parallel to the countershaft, sufficient space being provided by this arrangement to permit the drive shaft to be arranged transversely between the countershaft and the driven shaft and thus providing a compact arrangement for the gearing and the respective shafts. The angular arrangement of the drive shaft with respect to the other shafts also provides for disposing the driving motor at one side of the gear set where it will be out of the way and yet accessible. The gearing is enclosed in a casing having removable end plates in which suitable bearings are provided for the counter and the driven shaft. Bearings for the drive shaft are provided in the side walls of the casing and, in each instance, removable cover plates are provided for the bearings so that access thereto may be readily had. Furthermore, due to the arrangement whereby the motor is disposed at the side of the casing it is possible by merely removing one of the end plates to gain access to the entire interior of the casing.

In the drawings the gear set is indicated generally at 10 and comprises a casing consisting of a shell portion 11 which is provided with removable end plates 12 and 13 respectively. The countershaft 14 and the driven shaft 15 extend in substantially parallel relation within the casing and are spaced vertically to receive the change-speed gearing 16ª. This arrangement permits the reduction gearing 16 to be disposed between the countershaft and the driven shaft and provides a compact, nested arrangement for the reduction and change-speed gearing. The change-speed gearing comprises a series of preferably non-metallic driving gears 18, 19 and 20 held fast on the countershaft by means of the key 21 and a corresponding series of preferably hardened steel driven gears loosely mounted upon the driven shaft 15 and constantly in mesh with the non-metallic driving gears. Suitable spacers 22 are disposed on the countershaft between the respective driving gears and also between the driving gear 18 and the reduction gearing and between the driving gear 20 and the end plate 13. Interposed between the gears 23 and 25 and the gear 24 are hardened steel spacers 26. Each of the driven gears 23, 24 and 25 is provided with a keyway 27 which is adapted to register with the keyway 28 which extends longitudinally of the driven shaft 15 beyond the driven gears so as to provide for movement of the slidable key 29. Each of the spacing rings 26 is arranged to fit closely about the driven shaft 15 so that as the key 29 is moved longitudinally through the keyway 28 it will engage one of the rings 26 and will thereby be forced within the shaft 15 during the translation of the key from a position of operative engagement with one driven gear to a position of operative engagement with another driven gear, thereby precluding the possibility of having the key 29 engage more than one gear at a time. The key 29 is connected to the slidable collar 31 by means of the pin 32 which is carried by the collar and has its depending end reduced to fit a suitable recess in the end of the key so as to cause the latter to travel longitudinally of the shaft with the movable collar 31. The leaf spring 33 is connected to the under side of the key and adapted to urge the key into operative engagement with one of the driven gears.

The countershaft 14 and the driven shaft 15 are mounted in suitable bearings 34, which may be roller bearings as shown, and these bearings are mounted in recesses 35 in the end plates 12 and 13 respectively of the casing. The cover plates 36 for the bearings 34 are disposed in suitable recesses in the respective end plates and are held therein by means of the screws 36'. By virtue of this arrangement of the cover plates 36 and bearings 34, it is possible readily to gain access to the bearings for purposes of adjustment or repair. For the purpose of delivering power from the gear set to a machine for operating the latter, the driven shaft 15 is arranged to extend through the end plate 13 and the stuffing box 37 provided therefor.

Power delivered by a drving motor is transmitted to the countershaft by means of the driving shaft 40 which is disposed transversely of the casing between the countershaft 14 and the driven shaft 15 and carries the driving worm 41 which is in operative engagement with the worm wheel 17, the latter being held fast on the countershaft by the key 21. One end of the driving shaft 40 extends through the shell 11 for connection by means of the coupling 42 with the shaft 43 of the driving motor 44. Where the driving shaft passes through the shell it is journaled in a bearing 34 and also provided with a stuffing box 37 (not shown) the bearing and the stuffing box being arranged in the same manner as the bearing 34 and the stuffing box 37 provided for the driven shaft 15. The other end of the driving shaft is also journaled in a bearing 34 (not shown) mounted in the opposite side of the shell 11 and provided with the cover plate 38 (Fig. 3), the shaft being thus supported on each side of the driving worm by means of bearings which are easily accessible for adjustment or repair.

For the purpose of actuating the slidable key 29 from the exterior of the casing and thereby obtaining the desired speed ratio through the change-speed gearing, the offset bell crank 45 (Fig. 4) is journaled in the boss 46 of the shell 11 and has one arm 47 disposed outside of the shell and provided with the actuating handle 48, while the other arm 49 of this bell crank is disposed inside the shell and carries the shoe 49' which rides in the groove 50 of the collar 31. It will be understood therefore that by operating the handle 48 the collar 31 may be positioned for effecting engagement of the key 29 with any one of the driven gears 23, 24 or 25. In this way it is possible to utilize any of the ratios provided by the change-speed gearing for transmitting power from the countershaft to the driven shaft. In order that an additional range of effective speeds may be obtained and also for the purpose of permitting a change of speed to be effected without affecting the driven machine, the cone driving pulley 52 is loosely mounted, exteriorly of the casing, on the driven shaft 15 and is held in proper position thereon by means of the collar 53 which is fastened to the shaft by the pin 54. The pulley 52 is operatively connected to the shaft 16 by means of the clutch 56 which is controlled by the rocker arm 57 acting through the slidable collar 58 and the arm 59 of the clutch. The rocker arm 57 is held fast on the pin 61 by the set screw 62 and this pin 61 is journaled in the bracket 63 which is carried preferably by the cover plate 36. The rocker arm 57 is normally urged in a position to hold the clutch out of engagement with the pulley 52 by the spring 64 which is disposed in the seats 65 and 66 in the end plate 13 and in the end of the rocker arm 57 respectively. The pin 61 also carries an arm 67 which projects laterally from the pin so that it may serve as an actuating rod for effecting engagement of the clutch. If desired, this arm 67 may be connected with a suitable treadle for operation by the foot of the operator, thus making it possible for the operator to control the clutch and at the same time have both of his hands free for operating the machine.

While this gear is particularly well adapted for installation beneath the bench 70 (Figs. 2 and 3) it will be obvious that it may also be conveniently installed in other locations, as on the floor or on the bed plate of a machine. The arrangement of the driving motor at one side of the set reduces the maximum overall dimensions of the set and at the same time provides for ready access to the entire interior of the casing by merely removing one of the end plates, while each bearing becomes accessible for adjustment upon removal of its cover plate. The driving pulley 52 is also disposed adjacent the operating handle 48 for the change-speed gearing so that the driving belt may be shifted without inconvenience.

While only one form of this invention has been shown and described, it will be understood that the invention is susceptible to various changes and modifications which will occur to those skilled in the art to which this invention appertains, and that this invention is not limited except as indicated by the appended claims.

I claim:

1. In a device of the class described, the combination of a casing comprising a shell and removable end plates therefor, bearings mounted in the end plates, cover plates for the bearings, substantially parallel shafts mounted in the bearings, change-speed gearing mounted on the substantially parallel shafts, other bearings in the sides of the shell, a drive shaft mounted in said other bearings and disposed transversely between the substantially parallel shafts.

2. In a device of the class described, the combination of a casing comprising a shell and removable end plates therefor, bearings mounted in the end plates, cover plates for the bearings, substantially parallel shafts mounted in the bearings, change-speed gearing mounted on the substantially parallel shafts, other bearings in the sides of the shell, a drive shaft mounted in said other bearings and disposed transversely between the substantially parallel shafts, reduction gearing between the drive shaft and one of the substantially parallel shafts, and an actuating member slidable along the other of the latter shafts past the drive shaft for effecting a change in speed of said other shaft, thereby providing an accessible and yet compact, nested arrangement of parts.

Signed by me at Boston, Massachusetts this 18th day of July, 1929.

FREDERICK T. POTTER.